(12) United States Patent
Hartular et al.

(10) Patent No.: US 6,359,796 B2
(45) Date of Patent: Mar. 19, 2002

(54) TRANSIENT CONTROL FOR CONVERTER POWER SUPPLIES

(75) Inventors: Alexandru Hartular, Campbell; Sorin Laurentiu Negru; Laszlo Lipcsei, both of San Jose, all of CA (US)

(73) Assignee: 02 Micro International ltd., Grand Caymen BWI (KY)

(*) Notice: Subject to any disclaimer, the term of this patent is extended or adjusted under 35 U.S.C. 154(b) by 0 days.

(21) Appl. No.: 09/886,910

(22) Filed: Jun. 21, 2001

Related U.S. Application Data (60) Provisional application No. 60/221,308, filed on Jul. 28, 2000, and provisional application No. 60/227,497, filed on Aug. 24, 2000.

(51) Int. Cl.[7] ................................................ H02H 7/10
(52) U.S. Cl. ............................. 363/50; 363/39; 361/111
(58) Field of Search ............................. 363/15, 39, 50, 363/56.03, 56.05, 56.1, 56.11; 361/88, 90, 91.1, 111

(56) References Cited

U.S. PATENT DOCUMENTS

| | | | |
|---|---|---|---|
| 4,014,165 A | * | 3/1977 | Barto |
| 4,422,032 A | * | 12/1983 | Kakumoto et al. |
| 4,870,528 A | * | 9/1989 | Hartford |
| 5,535,085 A | * | 7/1996 | Tanaka et al. |
| 5,926,384 A | * | 7/1999 | Jochum |
| 5,945,806 A | * | 8/1999 | Faulk |
| 6,229,288 B1 | * | 5/2001 | Baretich et al. |
| 6,232,752 B1 | * | 5/2001 | Bissell |
| 6,266,257 B1 | * | 7/2001 | Geissler |

* cited by examiner

*Primary Examiner*—Adolf Deneke Berhane
(74) *Attorney, Agent, or Firm*—D. E. Schreiber (57) ABSTRACT

An active transient-control circuit included in a power supply responds swiftly to changes occurring in the output-power voltage produced by a power converter to reduce transient changes in the output-power voltage caused by sudden, substantial changes in the electrical current drawn by the load. To respond in this way, when the output-power voltage has a magnitude less than a lower pre-established-voltage threshold, the active transient-control circuit supplies electrical energy directly to the load from the input electrical power thereby augmenting output electrical power supplied to the load by the power converter. Correspondingly, when the output-power voltage has a magnitude that exceeds an upper pre-established-voltage threshold, the active transient-control circuit draws electrical energy directly from the output of the power converter.

28 Claims, 6 Drawing Sheets

TRANSIENT CONTROL FOR CONVERTER POWER SUPPLIES

CLAIM OF PROVISIONAL APPLICATION RIGHTS

This application claims the benefits both of United States Provisional Patent Application No. 60/221,308 filed on Jul. 28, 2000, and of United States Provisional Patent Application No. 60/227,497 filed on Aug. 24, 2000.

BACKGROUND OF THE INVENTION

1. Field of the Invention

The present invention relates generally to power supplies that include voltage-regulated direct current-to-direct current ("DC/DC") converters, and more particularly to reducing transient voltage excursions in output power delivered by such power supplies.

2. Description of the Prior Art

In numerous different applications, electrical power supplies, that include a voltage-regulated DC/DC converter, must accommodate substantial changes in electrical current drawn by a load coupled thereto that occur during a short interval of time. Because the voltage regulated DC/DC converter cannot instantaneously adjust its operation to compensate for a sudden, substantial change in the electrical current drawn by a load, for a short interval of time following such a load change the voltage of electrical power produced by the DC/DC converter may increase or decrease depending upon whether the load decreased or increased.

Figures 1, 7:
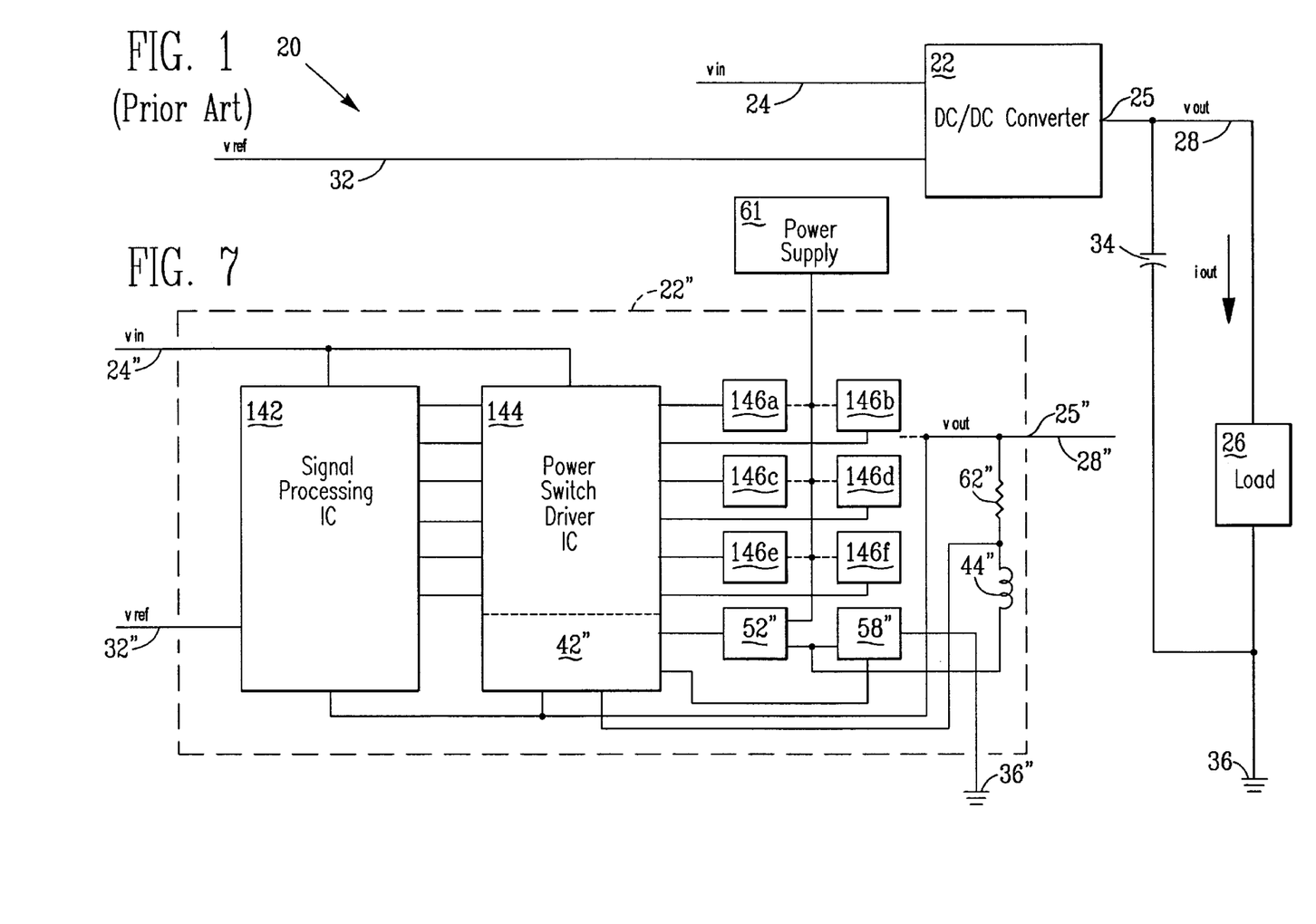
FIG. 1 is a circuit diagram depicting a conventional power supply that includes a DC/DC converter and a filter capacitor.
FIG. 7 is a block diagram illustrating a preferred partitioning for an integrated circuit ("IC") chip set for a DC/DC converter that includes the transient-control circuit.

FIG. 1 depicts a power supply, referred to by the general reference character 20, that implements a conventional approach for reducing transient voltage excursions in output power produced by a voltage-regulated DC/DC power converter 22 when electrical current drawn by a load changes. As depicted in FIG. 1, the DC/DC power converter 22 of the conventional power supply 20 receives input power at an input voltage $V_{in}$ via an input-power line 24. Energized by electrical power received via the input-power line 24, the voltage-regulated DC/DC power converter 22 of the power supply 20 supplies an electrical current $i_{out}$ from an output 25 to a load 26 via an output-power line 28. Moreover, the DC/DC power converter 22 includes circuits for regulating output-power voltage $v_{out}$ present on the output-power line 28 so that, for a specific configuration of the power supply 20, the output-power voltage $v_{out}$ may be equal to a reference voltage $v_{ref}$ that the DC/DC power converter 22 receives via a reference-voltage line 32. For other possible configurations of the power supply 20, the output-power voltage $v_{out}$ may be greater than or less than the reference voltage $v_{ref}$.

To reduce transient changes in the output-power voltage $v_{out}$ (e.g. ±50 millivolts in an interval of 50 to 100 nanoseconds) caused by sudden, substantial changes in the electrical current $i_{out}$ drawn by the load 26, the conventional power supply 20 also includes a filter capacitor 34. The filter capacitor 34 connects in parallel with the load 26 between the output-power line 28 and circuit ground 36. To effectively reduce such transient changes in the output-power voltage $v_{out}$, the filter capacitor 34 must possess a large capacitance, and exhibit a low equivalent series resistance ("ESR"). Because the filter capacitor 34 in a conventional power supply 20 must possess these electrical characteristics, such capacitors are, in general, physically large and comparatively expensive.

Accordingly, it would be advantageous to find a physically smaller and cheaper way to reduce transient changes in the output-power voltage $v_{out}$ caused by sudden, substantial changes in the electrical current $i_{out}$ drawn by the load 26 than the conventional filter capacitor 34. While an ability to achieve an equivalent reduction in transient changes in the output-power voltage $v_{out}$ from the power supply 20 that is smaller and less expensive is generally advantageous, such a capability is particularly advantageous for compact systems that occupy a limited amount of space such as laptop and notebook portable computers.

BRIEF SUMMARY OF THE INVENTION

An object of the present invention is to provide a smaller power supply that includes a DC/DC converter.

Another object of the present invention is to provide a more economical power supply that includes a DC/DC converter.

Another object of the present invention is to provide a smaller power supply that is capable of reducing transient changes in output-power voltage $v_{out}$ caused by sudden, substantial changes in the electrical current $i_{out}$ drawn by a load.

Briefly, the present invention in one embodiment is a power supply that includes both a voltage-regulated power converter and an active transient-control circuit. The voltage-regulated power converter:

1. receives input electrical power having an input-power voltage which possesses both a polarity and magnitude; and 2. produces output electrical power at an output of the power converter having output-power voltage $v_{out}$ which possesses both a pre-established polarity and magnitude.

The output electrical power thus produced is adapted to be supplied to a load coupled to the power supply. In a preferred embodiment of the present invention, the voltage-regulated power converter provides output electrical power having a voltage which possesses:

1. a polarity identical to that of the input electrical power; and 2. a magnitude that is less than the input-power voltage of the input electrical power present in the power supply.

The active transient-control circuit included in the power supply responds swiftly to changes occurring in the output-power voltage produced by the power converter to reduce transient changes in the output-power voltage $v_{out}$ caused by sudden, substantial changes in the electrical current $i_{out}$ drawn by the load. To respond in this way, when the output-power voltage has a magnitude less than a lower pre-established-voltage threshold, the active transient-control circuit supplies electrical energy directly to the load from the input electrical power thereby augmenting output electrical power supplied to the load by the power converter. Correspondingly, when the output-power voltage has a magnitude that exceeds an upper pre-established-voltage threshold, the active transient-control circuit draws electrical energy directly from the output of the power converter.

In a particularly preferred embodiment of the present invention, the active transient-control circuit augments output electrical power supplied to the load by the power converter only while such electrical current does not exceed a pre-established threshold for augmenting electrical current suppliable to the load. Correspondingly, in this particularly preferred embodiment the active transient-control circuit draws electrical energy directly from the output of the power converter only while electrical current drawn therefrom does not exceed a pre-established threshold or electrical current drawable from the output of said power converter.

An advantage of the present invention is that it permits using a substantially smaller filter capacitor.

These and other features, objects and advantages will be understood or apparent to those of ordinary skill in the art from the following detailed description of the preferred embodiment as illustrated in the various drawing figures.

DETAILED DESCRIPTION

Figure 2:
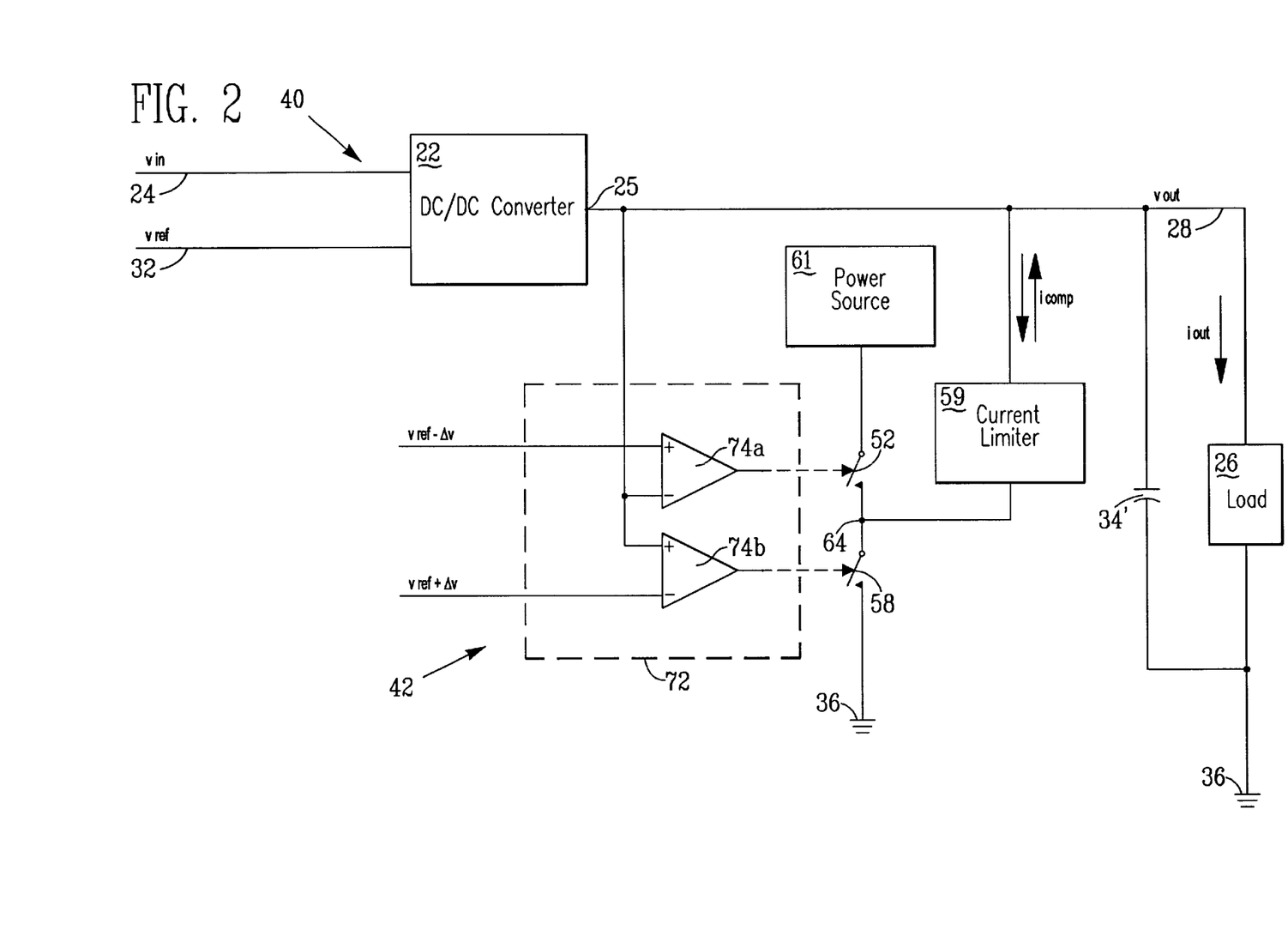
FIG. 2 is a circuit diagram depicting a generalized, generic configuration for a power supply having a transient-control circuit in accordance with the present invention.

FIG. 2 depicts a generalized, generic configuration for a power supply in accordance with the present invention referred to by the general reference character 40. Those elements of the power supply 40 depicted in FIG. 2 that are the same as, or functionally equivalent to, those of the power supply 20 illustrated in FIG. 1 carry the same reference numeral designation. The power supply 40 includes an transient-control circuit referred to by the general reference character 42. As depicted in FIG. 2, the transient-control circuit 42 includes both a first switch 52 and a second switch 58 coupled to each other at a junction 64. Both of the first and second switches 52 and 58 are open during normal operation of the power supply 40. The transient-control circuit 42 also includes a current limiter 59 coupled between the junction 64 and the output-power line 28 of the power supply 40.

A terminal of the second switch 58 furthest from the junction 64 is coupled to circuit ground 36. If during an excessively-high voltage-transient in output power delivered by the DC/DC power converter 22 the second switch 58 were to close, then an over-voltage compensation electrical current $-i_{comp}$, that tends to oppose the excessively-high voltage condition, flows from the output-power line 28 through the series-connected current limiter 59 and the second switch 58 to circuit ground 36. The generalized, generic transient-control circuit 42 also includes a power source 61 that supplies a voltage to a terminal of the first switch 52 that is furthest from the junction 64 which is greater than the voltage normally present on the output-power line 28. If during an excessively-low voltage-transient in output power delivered by the DC/DC power converter 22 the first switch 52 were to close, then an under-voltage compensation electrical current $+i_{comp}$, that tends to oppose the excessively-low voltage condition, flows from the power source 61 through the series-connected first switch 52 and current limiter 59 to the output-power line 28.

To effect closure of the first and second switches 52 and 58 when an appropriate voltage condition occurs on the output-power line 28, the transient-control circuit 42 includes a comparator circuit 72 enclosed within a dashed line in FIG. 2. In the illustration of FIG. 2, the comparator circuit 72 includes a pair of output-voltage comparators 74a and 74b which are respectively coupled to the first and second switches 52 and 58. Inverting and non-inverting inputs respectively of the output-voltage comparators 74a and 74b are coupled to the output-power line 28. A non-inverting input of the output-voltage comparator 74a receives a lower pre-established-voltage threshold $v_{ref}-\Delta v$. If the voltage present on the output-power line 28 momentarily drops below the lower pre-established-voltage threshold $v_{ref}-\Delta v$, then the output-voltage comparator 74a effects closure of the first switch 52 thereby providing an electrical current to the output-power line 28 which opposes the low-voltage transient. Correspondingly, an inverting input of the output-voltage comparator 74b receives an upper pre-established-voltage threshold $v_{ref}+\Delta v$. If the voltage present on the output-power line 28 momentarily exceeds the upper pre-established-voltage threshold $v_{ref}+\Delta v$, then the output-voltage comparator 74b effects closure of the second switch 58 thereby drawing an electrical current from the output-power line 28 which opposes the high-voltage transient. When either of the first or second switch 52 or 58 closes, the current limiter 59 moderates the compensation current $i_{comp}$ which flows between the output-power line 28 and the junction 64.

Figure 3:
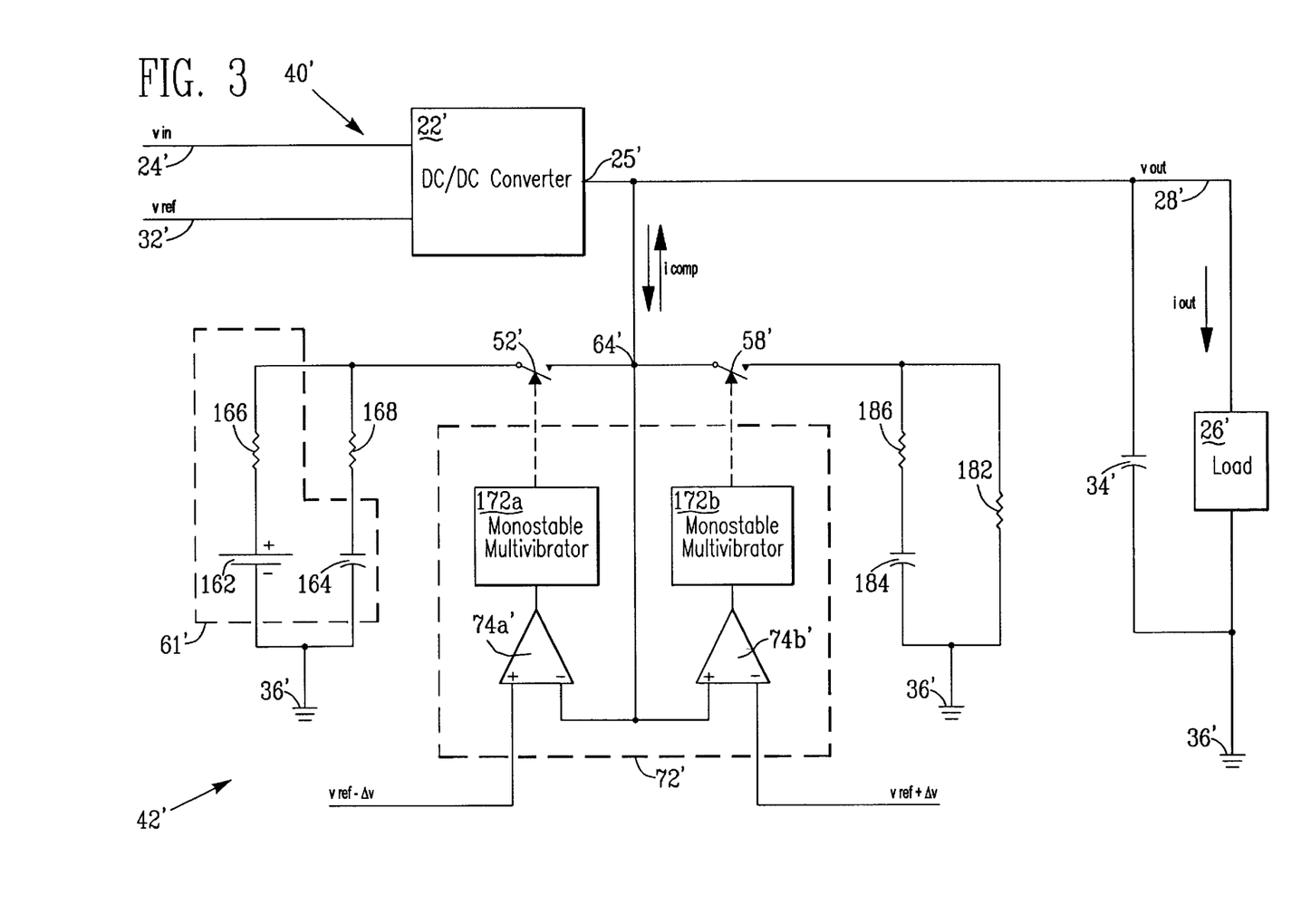
FIG. 3 is a circuit diagram depicting a power supply in accordance with the present invention that employs capacitors for supplying a transient-opposing electrical current.

FIG. 3 depicts a power supply 40 that includes in the power source 61 a capacitor for storing electrical energy that is used for opposing transient conditions on the output-power line 28. Those elements of the power supply 40 depicted in FIG. 3 that are the same as, or functionally equivalent to, those of the power supply 40 illustrated in FIG. 2 carry the same reference numeral distinguished by a prime (') designation.

In the embodiment of the transient-control circuit 42' depicted in FIG. 3, a battery 162, a capacitor 164, and a charging resistor 166, coupled in series with the battery 162, form the power source 61' depicted in FIG. 2. As depicted in FIG. 3, both the battery 162 and the capacitor 164 are coupled in parallel to circuit ground 36'.

So the power source 61' depicted in FIG. 3 can provide an electrical current to the output-power line 28' which opposes a low-voltage transient, the voltage which the battery 162 supplies to the charging resistor 166 must be of the same polarity as the voltage normally present on the output-power line 28', and must have a greater magnitude than the voltage normally present on the output-power line 28'. During intervals in which the first switch 52' remains open, the voltage across the capacitor 164 becomes substantially equal to that produced by the battery 162 due to electrical current flowing from the battery 162 in series through the charging resistor 166 and through a current-limiting resistor 168 into the capacitor 164.

In addition to the output-voltage comparator 74a', the comparator circuit 72' depicted in FIG. 3 includes a monostable multivibrator 172a disposed between the output-voltage comparator 74a' and the first switch 52'. Disposing the monostable multivibrator 172a in this location ensures that the first switch 52' remains closed throughout an interval of time, determined by the monostable multivibrator 172a, immediately after the output-voltage comparator 74a' detects a voltage present on the output-power line 28' that is below the lower pre-established voltage threshold $v_{ref}-\Delta v$. During the interval in which the first switch 52' remains closed, an electrical current flows both from the pre-charged capacitor 164 and from the battery 162 respectively through the current-limiting resistor 168 and the charging resistor 166 to the output-power line 28' to oppose a low-voltage transient condition. During each interval in which the first switch 52' remains closed, the charging resistor 166 and the current-limiting resistor 168 provide the current limiter 59' depicted in FIG. 2. When the interval established by the monostable multivibrator 172a ends, the first switch 52' returns to its open condition, and the power source 61' no longer supplies an electrical current that opposes the low-voltage transient condition.

Also in the embodiment of the transient-control circuit 421 depicted in FIG. 3, a discharging resistor 182 is coupled between the second switch 58' and circuit ground 36'. The discharging resistor 182 provides at least a portion of the current limiter 59' when the second switch 58' closes to oppose an excessively-high voltage-transient condition in output power delivered by the DC/DC power converter 22. The transient-control circuit 42' also includes a series-connected capacitor 184 and current-limiting resistor 186. During intervals in which the second switch 58' remains open, the voltage across the capacitor 184 becomes substantially equal to that at circuit ground 36' due to electrical current flowing between circuit ground 36' and the capacitor 184 through the series-connected discharging resistor 182 and current-limiting resistor 186.

In addition to the output-voltage comparator 74b', the comparator circuit 72' depicted in FIG. 3 includes a monostable multivibrator 172b disposed between the output-voltage comparator 74b ' and the second switch 58'. Disposing the monostable multivibrator 172b in this location ensures that the second switch 58' remains closed throughout an interval of time, determined by the monostable multivibrator 172b, immediately after the output-voltage comparator 74b' detects a voltage present on the output-power line 28' that exceeds the upper pre-established-voltage threshold $v_{ref}+\Delta v$. During the interval in which the second switch 58' remains closed, an electrical current flows from the output-power line 28' both to the capacitor 184 through the current-limiting resistor 186, and also to the circuit ground 36' through the discharging resistor 182 to oppose the excessively-high voltage-transient condition. During each interval in which the second switch 58' remains closed, the discharging resistor 182 and the current-limiting resistor 186 provide the current limiter 59' depicted in FIG. 2. When the interval established by the monostable multivibrator 172b ends, the second switch 58' returns to its open condition, and the transient-control circuit 42' no longer supplies an electrical current that opposes the excessively-high voltage-transient condition.

The time intervals established for the monostable multivibrator 172a and for the monostable multivibrator 172b are sufficiently long that before the first switch 52' or the second switch 58' opens the voltage across the capacitor 164 or capacitor 184 becomes substantially equal to the voltage present at the junction 64'. By selecting such a time interval for the monostable multivibrator 172a and the monostable multivibrator 172b, opening of the first switch 52' or the second switch 58' does not create a transient voltage excursion in the voltage present on the output-power line 28'. In comparison with the conventional power supply 20 illustrated in FIG. 1, for equivalent transient voltage excursion response incorporating the transient-control circuit 42, illustrated in FIGS. 2 and 3, into the power supply 40 permits replacing the large filter capacitor 34 with a substantially smaller and cheaper filter capacitor 34'.

Figure 4:
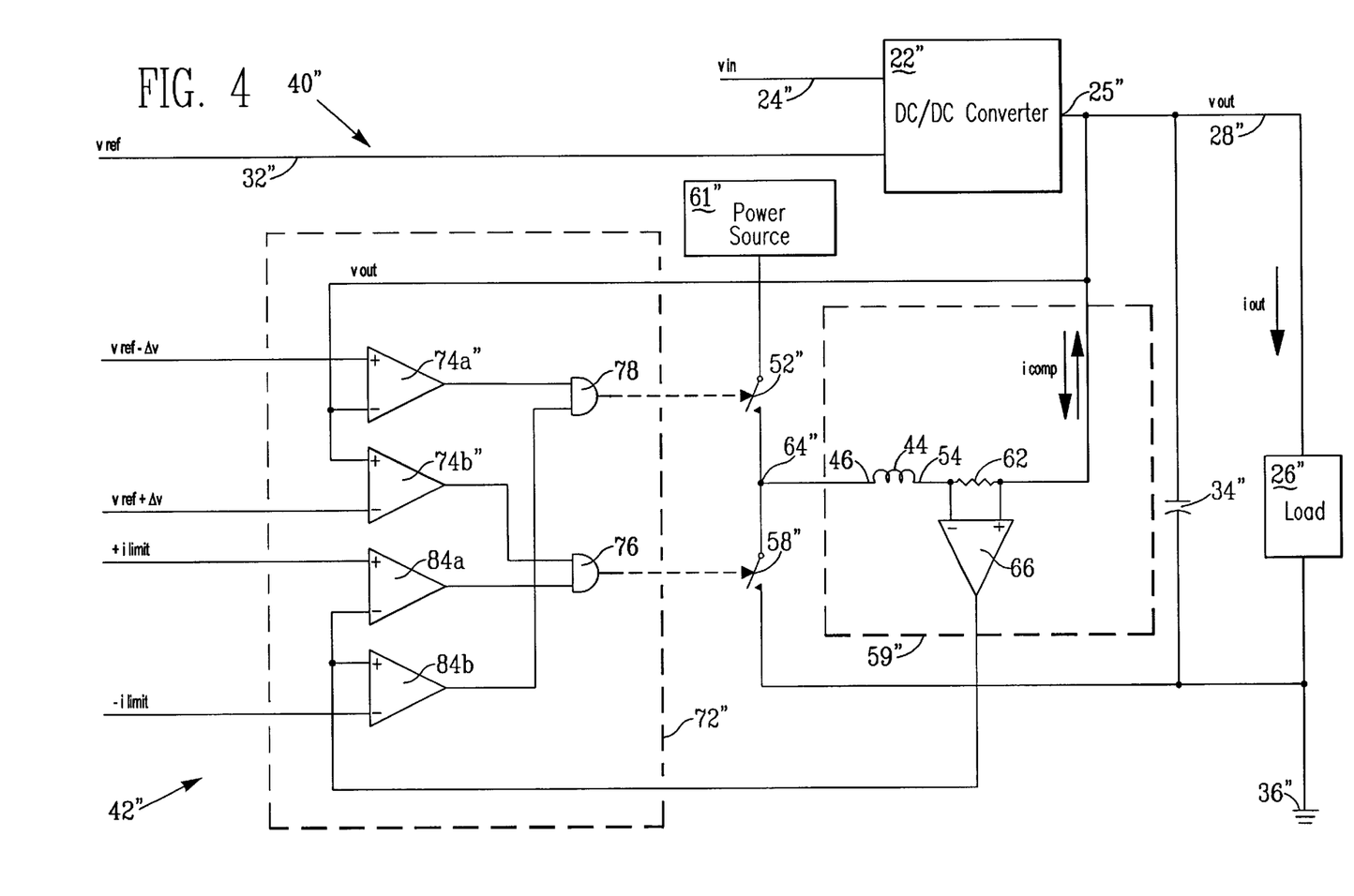
FIG. 4 is a circuit diagram depicting a power supply in accordance with the present invention that employs a direct current source for supplying a transient-opposing electrical current, and that implements a simplified active transient-control circuit.

FIG. 4 illustrates one configuration for the power supply 40" in which the power source 61" supplies an electrical current to the load 26" for opposing transient under-voltage excursions in the output voltage $v_{out}$. Those elements of the power supply 40" depicted in FIG. 4 that are the same as, or functionally equivalent to, those of the power supply 40 or 40' illustrated in FIGS. 2 or FIG. 3 carry the same reference numeral designation distinguished by a double prime (") designation. In addition to including the same or equivalent elements as the power supply 20, the power supply 40" of the present invention also includes a simplified, active transient-control circuit 42".

To permit proper operation of the active transient-control circuit 42" for the configuration of the power supply 40" depicted in FIG. 4, the voltage supplied by the power source 61" and the output-power voltage $v_{out}$ must have the same polarity. Furthermore, the voltage supplied by the power source 61" must have a magnitude that exceeds the output-power voltage $v_{out}$. While in the embodiment illustrated in FIG. 4, the power source 61" differs from the electrical power source $v_{in}$ supplied to the DC/DC power converter 22" via the input-power line 24", that is not an essential characteristic of the present invention. What is essential to the proper operation of the power supply 40" in accordance with the present invention is that there exist within the power supply 40" a source of electrical power for energizing the operation of the active transient-control circuit 42" that possesses the polarity and magnitude characteristics set forth immediately above.

The active transient-control circuit 42" illustrated in FIG. 4 includes an inductor 44 having a first terminal 46 that is coupled to the junction 64". A second terminal 54 of the inductor 44 connects to one terminal of a current-sensing resistor 62 the other terminal of which connects to the output 25" of the DC/DC power converter 22". The current-sensing resistor 62 permits sensing the compensation current $i_{comp}$ that flows through the inductor 44 upon closure either of the first switch 52" or of the second switch 58". A non-inverting input of a current-sensing amplifier 66 is coupled to that terminal of the current-sensing resistor 62 which is coupled the output 25" of the DC/DC power converter 22", and an inverting input of the current-sensing amplifier 66 is coupled to that terminal of the current-sensing resistor 62 which is coupled to the second terminal 54 of the inductor 44.

The current-sensing amplifier 66 provides an output signal to the comparator circuit 72" included in the active transient-control circuit 42". The comparator circuit 72" is also coupled to the output-power line 28" to receive the output-power voltage $v_{out}$ of the output electrical power produced by the DC/DC power converter 22" present there.

For the output-voltage comparators 74a and 74b" depicted in FIG. 4, a non-inverting input of the output-voltage comparator 74b" and an inverting input of the output-voltage comparator 74a" respectively receive the output-power voltage $v_{out}$ of the output electrical power produced by the DC/DC power converter 22". An inverting input of the output-voltage comparator 74b" receives an upper pre-established-voltage threshold $v_{ref}+\Delta v$. An output signal from the output-voltage comparator 74b" is coupled to an input of an over-voltage AND-gate 76. Correspondingly, a non-inverting input of the output-voltage comparator 74a" receives a lower pre-established-voltage threshold $v_{ref}-\Delta v$. An output signal from the output-voltage comparator 74a" is coupled to an input of an under-voltage AND-gate 78.

The comparator circuit 72" also includes a pair of compensation-current comparators 84a and 84b. A non-inverting input of the compensation-current comparator 84b and an inverting input of the compensation-current comparator 84a respectively receive the output signal from the current-sensing amplifier 66. An inverting input of the compensation-current comparator 84b receives a pre-established threshold for augmenting electrical current suppliable to the load 26", i.e. $-i_{limit}$. An output signal from the compensation-current comparator 84b is coupled to an input of the under-voltage AND-gate 78. Correspondingly, a non-inverting input of the compensation-current comparator 84a receives a pre-established threshold for electrical current drawable through the inductor 44 from the output 25" of the DC/DC power converter 22", i.e. $+i_{limit}$. An output signal from the compensation-current comparator 84b is coupled to an input of the over-voltage AND-gate 76.

An under-voltage signal from an output of the under-voltage AND-gate 78 controls operation of the first switch 52". Assertion of the under-voltage signal, which effects closure of the first switch 52" thereby coupling the power source 61" to the junction 64". Closure of the first switch 52" permits an under-voltage compensation electrical current, i.e. $-i_{comp}$, to flow directly from the power source 61" to the load 26" via the inductor 44, the current-sensing resistor 62 and the output-power line 28". The electrical current thus supplied to the output-power line 28" by the transient-control circuit 42" augments the electric current supplied to the load 26" by the DC/DC power converter 22". Assertion of the under-voltage signal by the under-voltage AND-gate 78 indicates both that:

1. the output-power voltage $v_{out}$ has a magnitude less than the lower pre-established-voltage threshold $v_{ref}-\Delta v$; and
2. the electrical current supplied to the load by the active transient-control circuit does not exceed the pre-established threshold for augmenting electrical current suppliable to the load, i.e. $-i_{limit}$. In this way the active transient-control circuit 42" supplies an electrical current to the load 26" that opposes and thereby reduces transient changes in the output voltage $v_{out}$ caused by a sudden, substantial increase in the electrical current $i_{out}$ drawn by the load 26".

An over-voltage signal from an output of the over-voltage AND-gate 76 controls operation of the second switch 58". Assertion of the over-voltage signal, which effects closure of the second switch 58", permits an over-voltage compensation electrical current, i.e. $+i_{comp}$, to flow directly from the output 25" of the DC/DC power converter 22" to the circuit ground 36" via the current-sensing resistor 62, and the inductor 44. Assertion of the over-voltage signal by the over-voltage AND-gate 76 indicates both that:

1. the output-power voltage $v_{out}$ has a magnitude which exceeds the upper pre-established-voltage threshold $v_{ref}+\Delta v$; and
2. the electrical current drawn from the output 25" of the DC/DC power converter 22" does not exceed the pre-established threshold for electrical current drawable through the inductor 44 from the output 25" of the DC/DC power converter 22", i.e. $+i_{limit}$.

In this way the active transient-control circuit 42" draws are electrical current from the output 25" of the DC/DC power converter 22" that opposes and thereby reduces transient changes in the output voltage $v_{out}$ caused by a sudden, substantial decrease in the electrical current iout drawn by the load 26".

If at any time the compensation current, i.e. either $-i_{comp}$ or $+i_{comp}$, exceeds the respective thresholds, i.e. $-i_{limit}$ or $+i_{limit}$, then the output signal from the respective compensation-current comparator 84a or 84b causes either the under-voltage or the over-voltage signal to be negated. Negating either the under-voltage or the over-voltage signal respectively opens either the first switch 52" or the second switch 58". Thus, the current-sensing amplifier 66 in combination with the compensation-current comparators 84a and 84b and the over-voltage AND-gate 76 and the under-voltage AND-gate 78 prevent excessively large electrical currents from flowing through the active transient-control circuit 42" which might damage the first switch 52" or the second switch 58". Such excessive currents can occur if a sufficient large transient voltage excursion were to persist too long without the voltage-regulated DC/DC power converter 22" adequately responding to the changed load, or if a short circuit were to occur between the output-power line 28" and circuit ground 36".

The first and second switches 52 and 58 are preferably power OS FET solid state switches. As those skilled in the art recognize, a power MOS FET switch includes a body diode connected in parallel with the power MOS FET's switched terminals. Because the first and second switches 52 and 58 inherently include body diodes, halting current flow through the inductor 44 produces only a slight reverse voltage across the first and second switches 52 and 58 during a brief interval after they respectively open.

Operating in this way, the active transient-control circuit 42" disclosed herein actively opposes transient voltage excursions in the output voltage $v_{out}$ supplied by power supply 40" to the load 26". Moreover, the inductor 44 and the current-sensing resistor 62 constitute a portion of the current limiter 59" that provides current limiting to a maximum compensation current of $\pm i_{limit}$.

Figure 5:
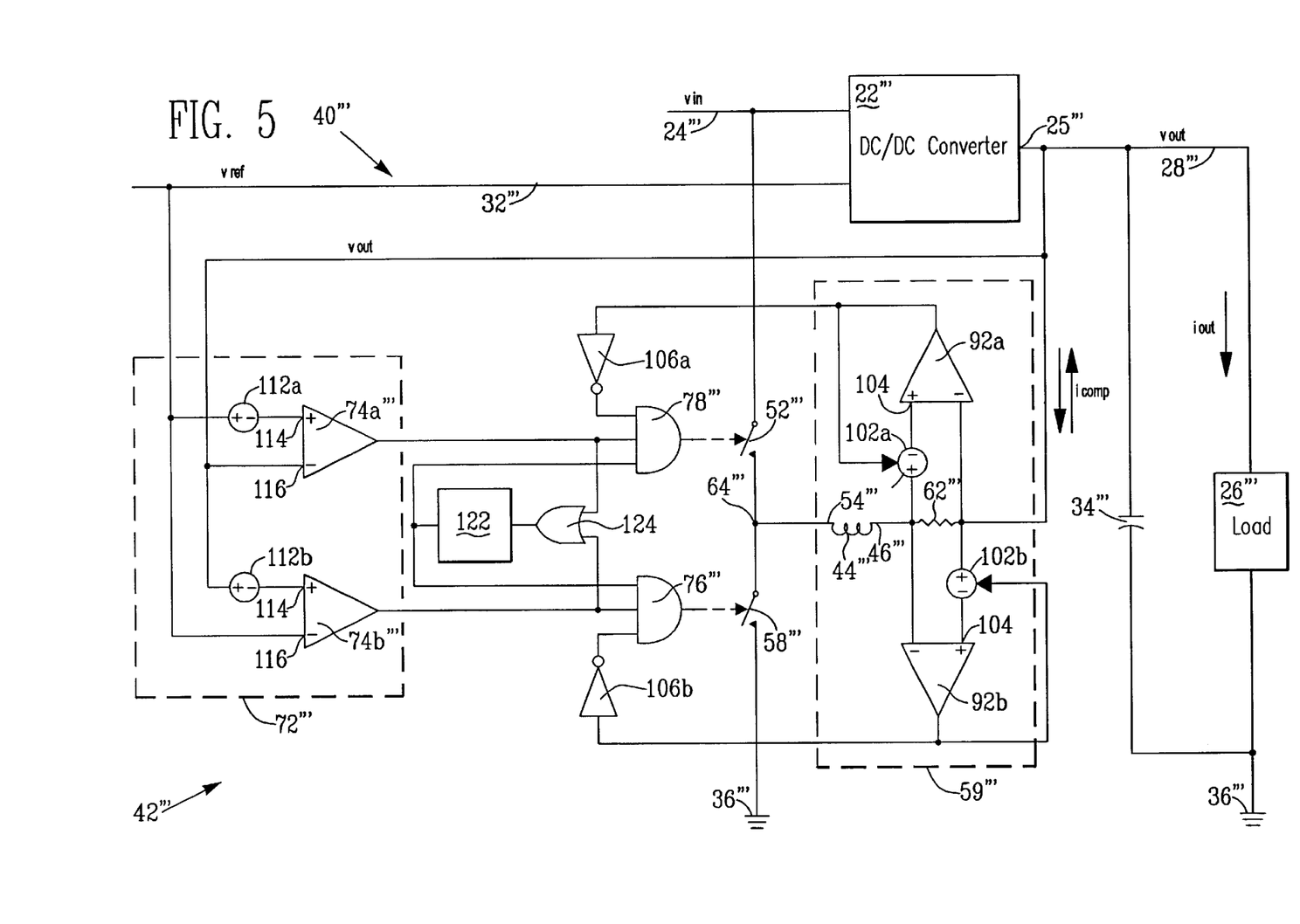
FIG. 5 is a circuit diagram depicting a power supply in accordance with the present invention that employs a direct current source for supplying a transient-opposing electrical current, and that implements a preferred embodiment of the active transient-control circuit.

FIG. 5 depicts yet another configuration for the power supply 40 in which a current source supplies an electrical current to the load 26 that opposes transient voltage excursions in the output voltage $v_{out}$. Those elements of the power supply 40 depicted in FIG. 5 that are the same as, or functionally equivalent to, those of the power supply 40 illustrated in FIGS. 2 through 4 carry the same reference numeral designation distinguished by a triple prime ("') designation.

Similar to the power supply 40 illustrated in FIG. 4, the power supply 40"' illustrated in FIG. 5 also includes an active transient-control circuit 42"'. A significant difference between the embodiments of the present invention respectively illustrated in FIGS. 4 and 5 is the inclusion of two (2) current-sensing comparators 92a and 92b in the transient-control circuit 42"'. Another difference is that electrical power supplied to the DC/DC power converter 22" via the input-power line 24" provides the power source 61. Similar to the current-sensing amplifier 66 depicted in FIG. 4, inputs of the comparators 92a and 92b illustrated in FIG. 5 are coupled across opposite terminals of the current-sensing resistor 62"'. Thus, the comparators 92a and 92b equip the transient-control circuit 42"' illustrated in FIG. 5 with fully complementary sensing of electrical current flowing through the current-sensing resistor 62"'.

Another, similarly significant difference between the two embodiments is the inclusion of two dual-threshold circuits 102a and 102b. The dual-threshold circuits 102a and 102b may be understood as being operatively located between one terminal of the current-sensing resistor 62''' and a non-inverting input 104 of one of the comparators 92a and 92b. As explained in greater detail below, responsive to output voltage present at outputs respectively of the comparators 92a and 92b, the dual-threshold circuits 102a and 102b always operatively interpose either a first threshold voltage $Dv_1$ or second threshold voltage $Dv_2$ between the voltage present at the current-sensing resistor 62''' and the non-inverting input 104 of the comparators 92a and 92b. The second threshold voltage $Dv_2$ interposed by each of the dual-threshold circuits 102a and 102b is only slightly less than the first threshold voltage $Dv_1$ interposed by that dual-threshold circuit 102, e.g. $Dv_2=90\%\ Dv_1$.

In addition to controlling the threshold voltage interposed by the dual-threshold circuit 102a, the output signal present at the output of the comparator 92a is also supplied through an inverter 106a to one input of a three-input under-voltage AND-gate 78'''. Correspondingly, in addition to controlling the threshold voltage interposed by the dual-threshold circuit 102b, the output signal present at the output of the comparator 92b is also supplied through an inverter 106b to one input of a three-input over-voltage AND-gate 76'''.

Another, difference between the embodiments of the present invention respectively illustrated in FIGS. 4 and 5 is the inclusion of two (2) fixed-threshold circuits 112a and 112b in the comparator circuit 72'''. The fixed-threshold circuits 112a and 112b connect respectively to a non-inverting input 114 of the output-voltage comparator 74a''' and of the output-voltage comparator 74b'''. The fixed-threshold circuit 112a operatively interposes a fixed threshold voltage $\Delta v$ between the output-power voltage $v_{out}$, supplied directly to the comparator circuit 72''', and the non-inverting input 114 of the output-voltage comparator 74b'''. Analogously, the fixed-threshold circuit 112b operatively interposes the fixed threshold voltage $\Delta v$ between the reference voltage $v_{ref}$, supplied directly to the comparator circuit 72''', and the non-inverting input 114 of the output-voltage comparator 74a'''. The output-power voltage $v_{out}$ is also supplied directly to the of the output-voltage comparator 74a''', while the reference voltage $v_{ref}$ is supplied directly to the of the output-voltage comparator 74b'''.

To prevent possibly damaging the first switch 52''' or the second switch 58''' while the transient-control circuit 42''' opposes transient voltage excursions in output power delivered by the power supply 40''', the transient-control circuit 42''' illustrated in FIG. 5 also includes a monostable multivibrator 122. The monostable multivibrator 122 supplies an output signal to inputs respectively of the over-voltage AND-gate 76''' and of the under-voltage AND-gate 78'''. Connected in this way, the over-voltage AND-gate 76''' and the under-voltage AND-gate 78''' can respectively assert their output signals to activate either the second switch 58''' or the first switch 52''' only throughout a limited time interval established by the monostable multivibrator 122.

To initiate the operational time interval for the first switch 52''' or the second switch 58''', the transient-control circuit 42''' also includes a two input OR-gate 124 which receives output signals both from the output-voltage comparator 74a''' and from the output-voltage comparator 74b'''. The OR-gate 124 supplies an output signal to an input of the monostable multivibrator 122. Thus, when the output signal either from the output-voltage comparator 74a''' or from the output-voltage comparator 74b''' first indicates a transient voltage excursion beyond the limits established for the power supply 40''', the output signal from the OR-gate 124 triggers the monostable multivibrator 122 to commence the limited time interval during which the transient-control circuit 42''' attempts to reduce transient voltage excursions on the output-power line 28'''.

Operating in this way, the inductor 44''' and the current-sensing resistor 62''' constitute a portion of the current limiter 59''' that provides an almost continuous current limiting action within 90% to 100% of $\pm i_{limit}$ throughout a time interval established by the monostable multivibrator 122.

Figure 6:
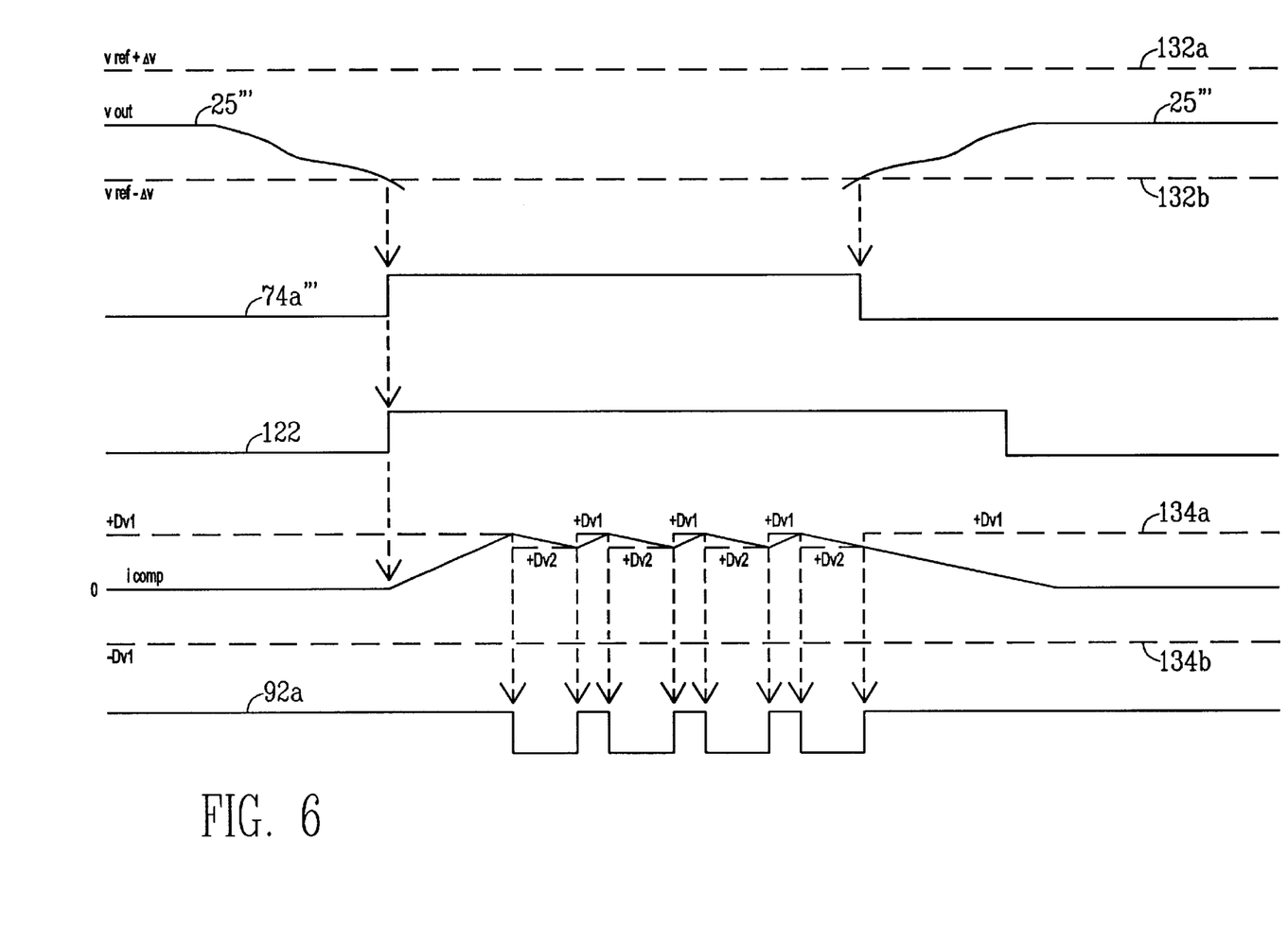
FIG. 6 is a waveform diagram depicting various waveforms which occur during operation of the preferred active transient-control circuit illustrated in FIG. 5 during a transient under-voltage excursion.

FIG. 6 depicts waveforms of various signals which occur within the preferred transient-control circuit 42''' during a transient under-voltage excursion. A pair of parallel dashed lines 132a and 132b at the top of FIG. 6 respectively indicate an upper-threshold, $v_{ref}+\Delta v$, and a lower-threshold, $v_{ref}-\Delta v$, for activating the transient-control circuit 42''' to oppose a transient voltage excursion on the output-power line 28'''. Graphed between the dashed lines 132a and 132b in FIG. 6 is a hypothetical output voltage from the DC/DC power converter 22''' at its output 25''' which is present on the output-power line 28''' during the hypothetical transient under-voltage excursion.

In FIG. 6, a waveform, depicted immediately beneath the dashed line 132b, illustrates the voltage signal present at the output of the output-voltage comparator 74a'''. Beneath the waveform that illustrates the voltage signal present at the output of the output-voltage comparator 74a''' is a waveform that illustrates the signal produced by the monostable multivibrator 122 when the transient under-voltage excursion occurs on the 28'''. The illustration of FIG. 6 presumes that the transient under-voltage excursion in $v_{out}$ has a duration which is less than the limited time interval established by the monostable multivibrator 122. Beneath the waveform that illustrates the signal produced by the monostable multivibrator 122, a second pair of parallel dashed lines 134a and 134b respectively indicate thresholds, $+Dv_1$ and $-Dv_1$, for electrical current flowing through the inductor 44''' and current-sensing resistor 62'''. Graphed between the dashed lines 134a and 134b in FIG. 6 is a hypothetical compensating electrical current icomp that flows through the inductor 44''' and current-sensing resistor 62''' during the hypothetical transient under-voltage excursion.

In the illustration of FIG. 6, when the output voltage present at the output 25''' of the DC/DC power converter 22''' drops below the lower-threshold, $v_{ref}-\Delta v$, the output signal from the output-voltage comparator 74a''' changes state to:

1. start the operational time interval established by the monostable multivibrator 122 during which the first switch 52''' or the second switch 58''' may remain closed; and
2. close the first switch 52''' thereby permitting an electrical current $+i_{comp}$ to flow from the input-power line 24''', which provides the power source 61 illustrated in FIG. 2, through the inductor 44''' and the current-sensing resistor 62''' to the output-power line 28''' of the power supply 40'''.

As illustrated by the graph of the electrical current $i_{comp}$, after the first switch 52''' closes the electrical current $+i_{comp}$ increases until reaching the threshold $+Dv_1$ established by the dual-threshold circuit 102a. Because as illustrated in FIG. 5 the output signal from the comparator 92a is fedback to the dual-threshold circuit 102a, when the electrical current $+i_{comp}$ reaches the threshold $+Dv_1$, the dual-threshold circuit 102a interposes the lower threshold voltage $+Dv_2$ to the non-inverting input 104 of the dual-threshold circuit 102a. This combined operation of the comparator 92a and the dual-threshold circuit 102a produces a voltage waveform at the output of the comparator 92a that is illustrated in FIG. 6 immediately beneath the dashed line 134b. Assertion of the output signal produced by comparator 92a causes the first switch 52''' to open which blocks the flow of the electrical current $+i_{comp}$ from the input-power line 24''' through the inductor 44''' and the current-sensing resistor 62''' to the output-power line 28''' of the power supply 40'''. Blocking the flow of the electrical current $+i_{comp}$ causes that current to decrease until it becomes less than the threshold $+Dv_2$ established by the dual-threshold circuit 102a.

When the electrical current $+i_{comp}$ drops below the threshold $+Dv_2$, the dual-threshold circuit 102a once again interposes the higher threshold voltage $+Dv_1$ to the non-inverting input 104 of the dual-threshold circuit 102a. Interposing the higher threshold voltage $+Dv_1$ causes the output signal produced by the comparator 92a to re-close the first switch 52''' to again provide the electrical current $+i_{comp}$ from the input-power line 24''' through the inductor 44''' and the current-sensing resistor 62''' to the output-power line 28''' of the power supply 40'''. By alternating back and forth between the two threshold voltages $+Dv_1$ and $+Dv_2$ in this way, during a transient voltage excursion the transient-control circuit 42''' maintains a substantially constant electrical current $+i_{comp}$ flowing through the inductor 44''' and the current-sensing resistor 62''' to the output-power line 28''' of the power supply 40'''. The transient-control circuit 42''' continues to supply this essentially constant $+i_{comp}$ to the to the output-power line 28''' of the power supply 40''' until either:

1. the transient under-voltage excursion ends as depicted in FIG. 6; or
2. the operational time interval established by the monostable multivibrator 122 during which the first switch 52''' or the second switch 58''' may close elapses.

If an over-voltage excursion rather than an under-voltage excursion such as that depicted in FIG. 6 occurs, the transient-control circuit 42''' operates conversely to that illustrated in FIG. 6 in that:

1. the threshold for the output voltage present at the output 25''' of the DC/DC power converter 22''' for activating the transient-control circuit 42''' is $v_{ref}+\Delta v$ illustrated in FIG. 6 by the dashed line 132a; and
2. the thresholds for a compensating electrical current $-i_{comp}$ are $-Dv_1$, illustrated in FIG. 6 by the dashed line 134b, and $-Dv_2$.

Operating in this converse manner during an over-voltage excursion, the transient-control circuit 42''' maintains a substantially constant electrical current $-i_{comp}$ flowing from the output-power line 28''' of the power supply 40''' through the current-sensing resistor 62''', the inductor 44''', and the second switch 58''' to circuit ground.

FIG. 7 illustrates a preferred partitioning for an IC chip set of a DC/DC power converter 22'' that includes the transient-control circuit 42'' depicted in FIG. 5. Presently, conventional implemenations of the DC/DC power converter 22'' using an IC chip set of a type that is available from several commercial vendors include two (2) ICs, a signal processing IC 142 and a power-switch driver IC 144. In addition, the conventional implementation of the DC/DC power converter 22'' also includes six (6) discrete power MOS FETs 146a–146f. Note that the illustration of FIG. 7 omits circuit details for the conventional DC/DC power converter 22'' which are well known to those skilled in the art, and which are shown and described in various different publications including U.S. Pat. Nos. 5,698,964, 5,723,970 and 5,920,475. In the conventional approach for implementing the DC/DC power converter 22'', all the circuitry required to generate six (6) signals for controlling operation of the power MOS PETs 146a–146f is located in the signal processing IC 142. The conventional DC/DC power converter 22'' transmits these six (6) control signals from the signal processing IC 142 to the power-switch driver IC 144 to be amplified in that IC to a strength sufficient for controlling operation of the power MOS FETs 146a–146f.

Adopting this conventional partitioning for the transient-control circuit 42'' depicted in FIG. 5 places all of its circuitry, except the AND-gates 76 and 78, the inductor 44'' and the current-sensing resistor 6211, in the signal processing IC 142. Such a conventional partitioning assigns the circuitry of the AND-gates 76 and 78 to the power-switch driver IC 144 for amplifying the control signals in that IC to a strength sufficient for controlling the first and second switches 52 and 58. However, to reduce the number of pins on the ICs 142 and 144, the preferred partitioning in accordance with the present invention places the entire transient-control circuit 42'', except the inductor 44'' and the current-sensing resistor 62'', in the power-switch driver IC 144. Use of this unconventional partitioning in implementing the transient-control circuit 42'' increases the number of pins required for the power-switch driver IC 144 by at most only four (4), and does not increase the number of pins required for the signal processing IC 142. The unconventional partitioning of the IC chip set for a DC/DC power converter 22 depicted in FIG. 7 is also employed advantageously when implementing the transient-control circuits 42' and 42'' depicted respectively in FIGS. 3 and 4.

Although the present invention has been described in terms of the presently preferred embodiment, it is to be understood that such disclosure is purely illustrative and is not to be interpreted as limiting. Thus, for example, electrical power supplied to the first switch 52 need not necessarily also energize operation of DC/DC power converter 22. Analogously, the output-power voltage $v_{out}$ may be less than, equal to, or greater than the reference voltage $v_{ref}$. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A power supply comprising both:
   a. a voltage-regulated power converter that:
      i) receives input electrical power having an input-power voltage which possesses both a polarity and magnitude: and
      ii) provides to a load coupled to an output of said power converter output electrical power having output-power voltage which possesses both a preestablished polarity and magnitude; and
   b. an active transient-control circuit, that responds swiftly to oppose a transient voltage excursion in the output-power voltage produced by said power converter, and which:
      i) when the output-power voltage has a magnitude less than a lower pre-established-voltage threshold, supplies electrical current directly to the load thereby augmenting output electrical power supplied to the load by said power converter; and
      ii) when the output-power voltage has a magnitude that exceeds an upper pre-established-voltage threshold, draws electrical current directly from the output of said power converter.

2. The power supply of claim 1 wherein said active transient-control circuit draws electrical current supplied to the load from an electrical power-source which has:
  c. a polarity identical to that of the output electrical power; and
  d. a magnitude which exceeds that of the output electrical power.

3. The power supply of claim 2 wherein said active transient-control circuit includes:
  e. an inductor having a first terminal that is coupled to the output of said power converter;
  f. a normally-open first switch for establishing a coupling between a second terminal of the inductor and the electrical power-source;
  g. a normally-open second switch for establishing a coupling between the second terminal of the inductor and circuit ground; and
  h. a comparator circuit which is coupled to the output electrical power produced by said power converter, and responsive thereto produces both:
    i) an under-voltage signal which when asserted:
      (1) indicates that the output-power voltage has a magnitude less than the lower pre-established-voltage threshold; and
      (2) is supplied as a control signal to activate the first switch thereby establishing with the first switch a series circuit coupling the inductor between the output of said power converter and the electrical power-source; and
    ii) an over-voltage signal which when asserted:
      (1) indicates that the output-power voltage has a magnitude that exceeds the upper pre-established-voltage threshold; and
      (2) is supplied as a control signal to activate the second switch thereby establishing with the second switch a series circuit coupling the inductor between the output of said power converter and circuit ground.

4. The power supply of claim 3 wherein the electrical power-source from which said active transient-control circuit draws electrical current is the input electrical power received by said power converter.

5. The power supply of claim 2 wherein said active transient-control circuit included therein:
  stops supplying electrical current directly to the load from the electrical power-source when electrical current supplied to the load exceeds a pre-established threshold for augmenting electrical current suppliable to the load; and
  stops drawing electrical current directly from the output of said power converter when electrical current drawn therefrom exceeds a pre-established threshold for electrical current drawable from the output of said power converter.

6. The power supply of claim 5 wherein said active transient-control circuit includes:
  e. an inductor having a first terminal that is coupled to the output of said power converter;
  f. a normally-open first switch for establishing a coupling between a second terminal of the inductor and the electrical power-source;
  g. a normally-open second switch for establishing a coupling between the second terminal of the inductor and circuit ground;
  h. a current-sensing circuit coupled in series with the inductor that is adapted to produce a current-sensing signal which responds both:
    i) to electrical current supplied to the load by said active transient-control circuit; and
    ii) to electrical current drawn from the output of said power converter by said active transient-control circuit; and
  i. a comparator circuit which is coupled both to the output electrical power produced by said power converter and to the current-sensing circuit, and responsive to the output-power voltage of the output electrical power and to the current-sensing signal received from the current-sensing circuit produces both:
    i) an under-voltage signal which when asserted:
      (1) indicates both that:
        (a) the output-power voltage has a magnitude less than the lower pre-established-voltage threshold; and
        (b) the electrical current supplied to the load by said active transient-control circuit does not exceed the pre-established threshold for augmenting electrical current suppliable to the load; and
      (2) is supplied as a control signal to activate the first switch thereby establishing with the first switch a series circuit coupling the inductor between the output of said power converter and the electrical power-source; and
    ii) an over-voltage signal which when asserted:
      (1) indicates both that:
        (a) the output-power voltage has a magnitude that exceeds the upper pre-established-voltage threshold; and
        (b) the electrical current drawn from the output of said power converter by said active transient-control circuit does not exceed the pre-established threshold for electrical current drawable therefrom; and
      (2) is supplied as a control signal to activate the second switch thereby establishing with the second switch a series circuit coupling the inductor between the output of said power converter and circuit ground.

7. The power supply of claim 6 wherein the electrical power-source from which said active transient-control circuit draws electrical current is the input electrical power received by said power converter.

8. The power supply of claim 2 wherein said active transient-control circuit included therein:
  supplies a substantially constant electrical current directly to the load from the electrical power-source after electrical current supplied to the load exceeds a pre-established threshold for augmenting electrical current suppliable to the load; and
  draws a substantially constant electrical current directly from the output of said power converter after electrical current drawn therefrom exceeds a pre-established threshold for electrical current drawable from the output of said power converter.

9. The power supply of claim 8 wherein said active transient-control circuit includes:
  e. an inductor having a first terminal that is coupled to the output of said power converter;
  f. a normally-open first switch for establishing a coupling between a second terminal of the inductor and the electrical power-source;
  g. a normally-open second switch for establishing a coupling between the second terminal of the inductor and circuit ground;

h. a dual threshold current-sensing circuit coupled in series with the inductor that is adapted to produce a current-sensing signal which responds both:
  i) to electrical current supplied to the load by said active transient-control circuit; and
  ii) to electrical current drawn from the output of said power converter by said active transient-control circuit; and
i. a comparator circuit, which is coupled to and responsive to the output electrical power produced by said power converter, that produces both:
  i) an under-voltage signal which when asserted:
    (1) indicates that the output-power voltage has a magnitude less than the lower pre-established-voltage threshold; and
    (2) is supplied as a control signal to activate the first switch thereby establishing with the first switch a series circuit coupling the inductor between the output of said power converter and the electrical power-source; and
  ii) an over-voltage signal which when asserted:
    (1) indicates that the output-power voltage has a magnitude that exceeds the upper pre-established-voltage threshold; and
    (2) is supplied as a control signal to activate the second switch thereby establishing with the second switch a series circuit coupling the inductor between the output of said power converter and circuit ground.

10. The power supply of claim 9 wherein the electrical power-source from which said active transient-control circuit draws electrical current is the input electrical power received by said power converter.

11. The power supply of claim 8 wherein said active transient-control circuit stops opposing the transient voltage excursion after a pre-established time interval elapses.

12. The power supply of claim 2 wherein the power supply includes:
  e. a number of discrete power MOS FETS; and
  f. two (2) integrated circuits (" Ics"); the ICs being:
    i. a signal processing IC; and
    ii. a power-switch driver IC that:
      1) receives from the signal processing IC signals for controlling operation of at least some of the power MOS FETs; and
      2) amplifies the received control signals to a strength sufficient for controlling operation of the power MOS FETS; and
wherein the active transient-control circuit, excluding at least power MOS FETS, is located mainly in the power-switch driver IC.

13. The power supply of claim 1 wherein said active transient-control circuit draws the electrical current supplied to the load through a limiting resistor from a pre-charged capacitor.

14. The power supply of claim 13 wherein electrical current for pre-charging said capacitor is drawn from the input electrical power received by said power converter.

15. An active transient-control circuit adapted for inclusion in a power supply for use with a voltage-regulated power converter that:
  a. receives input electrical power having an input-power voltage which possesses both a polarity and magnitude, and
  b. provides to a load coupled to an output of said power converter output electrical power having output-power voltage which possesses both a pre-established polarity and magnitude; the active transient-control circuit comprising an electrical circuit:
  a. that responds swiftly to oppose a transient voltage excursion in the output-power voltage produced by said power converter; and
  b. which:
    i) when the output-power voltage has a magnitude less than a lower pre-established-voltage threshold, supplies electrical current directly to the load thereby augmenting output electrical power supplied to the load by said power converter; and
    ii) when the output-power voltage has a magnitude that exceeds an upper pre-established-voltage threshold, draws electrical current directly from the output of said power converter.

16. The active transient-control circuit of claim 15 wherein said active transient-control circuit is adapted for drawing electrical current supplied to the load from an electrical power-source which has:
  c. a polarity identical to that of the output electrical power; and
  d. a magnitude which exceeds that of the output electrical power.

17. The active transient-control circuit of claim 16 having:
  e. an inductor having a first terminal that is coupled to the output of said power converter;
  f. a normally-open first switch for establishing a coupling between a second terminal of the inductor and the electrical power-source;
  g. a normally-open second switch for establishing a coupling between the second terminal of the inductor and circuit ground; and
  h. a comparator circuit which is coupled to the output electrical power produced by said power converter, and responsive thereto produces both:
    i) an under-voltage signal which when asserted:
      (1) indicates that the output-power voltage has a magnitude less than the lower pre-established-voltage threshold; and
      (2) is supplied as a control signal to activate the first switch thereby establishing with the first switch a series circuit coupling the inductor between the output of said power converter and the electrical power-source; and
    ii) an over-voltage signal which when asserted:
      (1) indicates that the output-power voltage has a magnitude that exceeds the upper pre-established-voltage threshold; and
      (2) is supplied as a control signal to activate the second switch thereby establishing with the second switch a series circuit coupling the inductor between the output of said power converter and circuit ground.

18. The active transient-control circuit of claim 17 wherein the electrical power-source from which said active transient-control circuit is adapted for drawing electrical current is the input electrical power received by said power converter.

19. The active transient-control circuit of claim 16 which:
stops supplying electrical current directly to the load from the electrical power-source when electrical current supplied to the load exceeds a pre-established threshold for augmenting electrical current suppliable to the load; and
stops drawing electrical current directly from the output of said power converter when electrical current drawn therefrom exceeds a pre-established threshold for electrical current drawable from the output of said power converter.

20. The active transient-control circuit of claim 19 having:
e. an inductor having a first terminal that is coupled to the output of said power converter;
f. a normally-open first switch for establishing a coupling between a second terminal of the inductor and the electrical power-source;
g. a normally-open second switch for establishing a coupling between the second terminal of the inductor and circuit ground;
h. a current-sensing circuit coupled in series with the inductor that is adapted to produce a current-sensing signal which responds both:
   i) to electrical current supplied to the load by said active transient-control circuit; and
   ii) to electrical current drawn from the output of said power converter by said active transient-control circuit; and
i. a comparator circuit which is coupled both to the output electrical power produced by said power converter and to the current-sensing circuit, and responsive to the output-power voltage of the output electrical power and to the current-sensing signal received from the current-sensing circuit produces both:
   i) an under-voltage signal which when asserted:
      (1) indicates both that:
         (a) the output-power voltage has a magnitude less than the lower pre-established-voltage threshold; and
         (b) the electrical current supplied to the load by said active transient-control circuit does not exceed the pre-established threshold for augmenting electrical current suppliable to the load; and
      (2) is supplied as a control signal to activate the first switch thereby establishing with the first switch a series circuit coupling the inductor between the output of said power converter and the electrical power-source; and
   ii) an over-voltage signal which when asserted:
      (1) indicates both that:
         (a) the output-power voltage has a magnitude that exceeds the upper pre-established-voltage threshold; and
         (b) the electrical current drawn from the output of said power converter by said active transient-control circuit does not exceed the pre-established threshold for electrical current drawable therefrom; and
      (2) is supplied as a control signal to activate the second switch thereby establishing with the second switch a series circuit coupling the inductor between the output of said power converter and circuit ground.

21. The active transient-control circuit of claim 20 wherein the electrical power-source from which said active transient-control circuit is adapted for drawing electrical current is the input electrical power received by said power converter.

22. The active transient-control circuit of claim 16 which:
supplies a substantially constant electrical current directly to the load from the electrical power-source after electrical current supplied to the load exceeds a pre-established threshold for augmenting electrical current suppliable to the load; and
draws a substantially constant electrical current directly from the output of said power converter after electrical current drawn therefrom exceeds a pre-established threshold for electrical current drawable from the output of said power converter.

23. The active transient-control circuit of claim 22 having:
e. an inductor having a first terminal that is coupled to the output of said power converter;
f. a normally-open first switch for establishing a coupling between a second terminal of the inductor and the electrical power-source;
g. a normally-open second switch for establishing a coupling between the second terminal of the inductor and circuit ground;
h. a dual threshold current-sensing circuit coupled in series with the inductor that is adapted to produce a current-sensing signal which responds both:
   i) to electrical current supplied to the load by said active transient-control circuit; and
   ii) to electrical current drawn from the output of said power converter by said active transient-control circuit; and
i. a comparator circuit, which is coupled to and responsive to the output electrical power produced by said power converter, that produces both:
   i) an under-voltage signal which when asserted:
      (1) indicates that the output-power voltage has a magnitude less than the lower pre-established-voltage threshold; and
      (2) is supplied as a control signal to activate the first switch thereby establishing with the first switch a series circuit coupling the inductor between the output of said power converter and the electrical power-source; and
   ii) an over-voltage signal which when asserted:
      (1) indicates that the output-power voltage has a magnitude that exceeds the upper pre-established-voltage threshold; and
      (2) is supplied as a control signal to activate the second switch thereby establishing with the second switch a series circuit coupling the inductor between the output of said power converter and circuit ground.

24. The active transient-control circuit of claim 23 wherein the electrical power-source from which said active transient-control circuit is adapted for drawing electrical current is the input electrical power received by said power converter.

25. The active transient-control circuit of claim 22 which stops opposing the transient voltage excursion after a pre-established time interval elapses.

26. The active transient-control circuit of claim 16 wherein the power supply includes:
e. a number of discrete power MOS FETs; and
f. two (2) ICs; the ICs being:
   i. a signal processing IC; and
   ii. a power-switch driver IC that:
      1) receives from the signal processing IC signals for controlling operation of at least some of the power MOS FETs; and
      2) amplifies the received control signals to a strength sufficient for controlling operation of the power MOS FETS; and
wherein the active transient-control circuit, excluding at least power MOS FETs, is located mainly in the power-switch driver IC.

27. The active transient-control circuit of claim 15 wherein the electrical current supplied to the load is drawn through a limiting resistor from a capacitor.

28. The active transient-control circuit of claim 27 being adapted for drawing electrical current for pre-charging said capacitor from the input electrical power received by said power converter.

* * * * *